United States Patent
Miller

(10) Patent No.: US 11,656,140 B1
(45) Date of Patent: May 23, 2023

(54) COATED FIBER OPTIC PRESSURE SENSOR WITH IMPROVED ACCELERATION RESPONSE

(71) Applicant: GOVERNMENT OF THE UNITED STATES OF AMERICA, AS REPRESENTED BY THE SECRETARY OF THE NAVY, Arlington, VA (US)

(72) Inventor: Gary A. Miller, Springfield, VA (US)

(73) Assignee: The Government of the United States of America, as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 17/728,036

(22) Filed: Apr. 25, 2022

(51) Int. Cl.
 G01L 11/02 (2006.01)
 G01V 1/18 (2006.01)
 G01L 11/04 (2006.01)
 G01D 5/353 (2006.01)

(52) U.S. Cl.
 CPC ........ G01L 11/025 (2013.01); G01D 5/35316 (2013.01); G01L 11/04 (2013.01); G01V 1/186 (2013.01)

(58) Field of Classification Search
 CPC ... G01L 11/025; G01L 11/04; G01D 5/35316; G01V 1/186
 See application file for complete search history.

(56) References Cited

U.S. PATENT DOCUMENTS

| | | |
|---|---|---|
| 4,979,798 A | 12/1990 | Lagakos et al. |
| 5,363,342 A | 11/1994 | Layton et al. |
| 5,513,913 A | 5/1996 | Ball et al. |
| 5,867,258 A | 2/1999 | Frederick et al. |
| 6,191,414 B1 | 2/2001 | Ogle et al. |
| 6,233,374 B1 | 5/2001 | Ogle et al. |
| 6,422,084 B1 | 7/2002 | Fernald et al. |
| 6,611,633 B1 | 8/2003 | Vohra et al. |
| 7,251,023 B2 | 7/2007 | Bohnert et al. |

(Continued)

OTHER PUBLICATIONS

Stolte, R. et al., Er-fibre lasers: suppression of spatial hole burning by internal modulation, Electronics Letters, Sep. 16, 1993, pp. 1686-1688, vol. 29, No. 19, The Institution of Engineering and Technology, London, UK.

(Continued)

*Primary Examiner* — Seung C Sohn
(74) *Attorney, Agent, or Firm* — US Naval Research Laboratory; Suresh Koshy

(57) ABSTRACT

An active apparatus includes a pressure sensor array. The pressure sensor array includes at least one transducer and a standard optical fiber mechanically coupled thereto. The active apparatus includes a distributed Bragg reflector fiber laser located within the optical fiber. The fiber laser emits a wavelength. The fiber laser consists of two fiber Bragg gratings, which define a linear cavity. The linear cavity is mechanically coupled to the at least one transducer. A pressure change detected by the at least one transducer causes at least one property change in the optical fiber. For example, the at least one property change in the optical fiber causes a change in the cavity length. The change in the cavity length causes a wavelength shift relative to the wavelength emitted by the fiber laser.

20 Claims, 14 Drawing Sheets

(56) References Cited

U.S. PATENT DOCUMENTS

| | | | |
|---|---|---|---|
| 8,130,594 | B2 | 3/2012 | Bedwell |
| 8,200,050 | B2 | 6/2012 | Foster et al. |
| 8,290,316 | B2 | 10/2012 | Molin et al. |
| 9,103,713 | B2 | 8/2015 | Launay et al. |
| 2021/0379340 | A1* | 12/2021 | Stoker .................. G01L 11/025 |

OTHER PUBLICATIONS

Zhang, Jianluo et al., Stable Single-Mode Compound-Ring Erbium-Doped Fiber Laser, Journal of Lightwave Technology, Jan. 1996, pp. 104-109, vol. 14, No. 1, IEEE Photonics Society, Piscataway, NJ.

Campopiano, Stephania et al., Underwater Acoustic Sensors Based on Fiber Bragg Gratings, Sensors, Jun. 5, 2009, pp. 4446-4454, vol. 9, Multidisciplinary Digital Publishing Institute, Basel, Switzerland.

Horowitz, Moshe et al., Filtering behavior of a self-induced three-mirror cavity formed by intracavity wave mixing in a saturable absorber, Optics Letters, Feb. 15, 1996, pp. 299-301, vol. 21, No. 4, The Optical Society, Washington, DC.

Chernikov, S.V. et al., Coupled-cavity erbium fiber lasers incorporating fiber grating reflectors, Optics Letters, Dec. 1, 1993, pp. 299-301, vol. 18, No. 23, The Optical Society, Washington, DC.

Hocker, G.B., Fiber-optic acoustic sensors with increased sensitivity by use of composite structures, Optics Letters, Oct. 1979, pp. 320-321, vol. 4, No. 10, The Optical Society, Washington, DC.

Zhao, Yanjie et al., Research on a novel composite structure Er3+-doped DBR fiber laser with a $\pi$-phase shifted FBG, Optics Express, Sep. 17, 2013, pp. 22515-22522, vol. 21, No. 19, The Optical Society, Washington, DC.

Rodriguez-Cobo, L. et al., Single-longitudinal mode laser structure based on a very narrow filtering technique, Optics Express, Apr. 18, 2013, pp. 10289-10294, vol. 21, No. 19, The Optical Society, Washington, DC.

Moccia, Massimo et al., Resonant Hydrophones Based on Coated Fiber Bragg Gratings, Journal of Lightwave Technology, Aug. 1, 2012, pp. 2472-2481, vol. 30, No. 15, IEEE Photonics Society, Piscataway, NJ.

Feng, Sucheng et al. Single-longitudinal-mode erbium-doped fiber laser with multiplelinear Cavity, Photonics and Optoelectronics Meetings (POEM) 2008: Optoelectronic Devices and Integration edited by Liming Zhang, Michael J. O'Mahony, Proc. of SPIE, 2008, pp. 72790D-1-72790D-4, vol. 7279, SPIE: Society of Photo-Optical Instrumentation Engineers, Bellingham, WA.

Chang, Sun Hyok et al., Widely Tunable Single-Frequency Er-Doped Fiber Laser with Long Linear Cavity, IEEE Photonics Technology Letters, Apr. 2001, pp. 287-289, vol. 13, No. 4, IEEE Photonics Society, Piscataway, NJ.

Vivek, K. et al. An Improved Polymer Shell Encapsulated Fiber Laser Hydrophone, IEEE Sensors Journal, Jan. 15, 2018, pp. 589-595, vol. 18. No. 2, IEEE Sensors Council, Piscataway, NJ.

Azmi, Asrul Izam, Sensitivity Enhancement in Composite Cavity Fiber Laser Hydrophone, Journal of Lightwave Technology, Jun. 15, 2010, pp. 1844-18509, vol. 28, No. 12, IEEE Photonics Society, Piscataway, NJ.

Spiegelberg, Christine et al., Low-Noise Narrow-Linewidth Fiber Laser at 1550 nm (Jun. 2003), Journal of Lightwave Technology, Jan. 2004, pp. 57-62, vol. 22, No. 1, IEEE Photonics Society, Piscataway, NJ.

Lagakos, Nicholas et al., Optimizing Fiber Coatings for Interferometric Acoustic Sensors, IEEE Journal of Quantum Electronics, Apr. 1982, pp. 683-689, vol. QE-18, No. 4, IEEE Photonics Society, Piscataway, NJ.

Cole, James H. et al., Preliminary Investigation of Air-Included Polymer Coatings for Enhanced Sensitivity of Fiber-optic Acoustic Sensors, 2002 15th Optical Fiber Sensors Conference Technical Digest. OFS 2002(Cat. No. 02EX533), May 10, 2002, pp. 317-320, vol. 1, doi: 10.1109/OFS.2002.1000567, IEEE, Piscataway, NJ.

Ibsen, M. et al. Broadly tunable DBR fibre laser using sampled fibre kagg gratings, Electronics Letters, Jan. 5, 1995, pp. 37-38, vol. 13, No. 1, The Institution of Engineering and Technology, London, UK.

Wu, Bo et al., Stable Narrow Linewidth Er-Doped Fiber Laser at 1550 nm, Microwave and Optical Technology Letters, Jun. 2007, pp. 1453-1456, vol. 49, No. 6, Wiley-Blackwell, Hoboken, NJ.

* cited by examiner

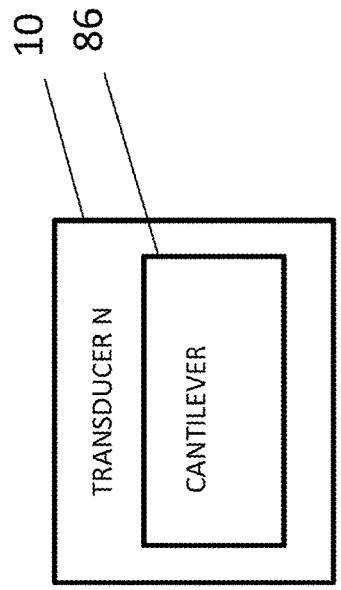
FIG. 2A
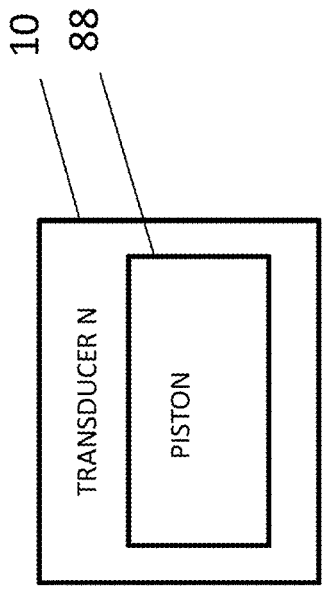
FIG. 2B
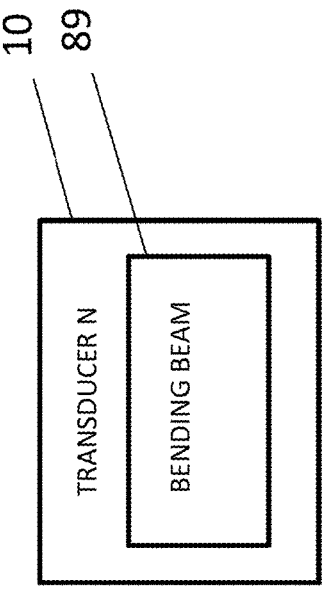
FIG. 2C
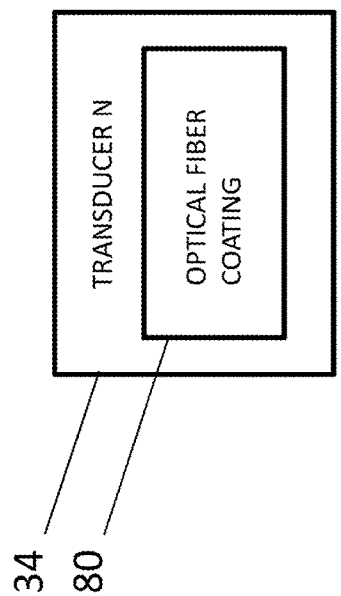
FIG. 2D
FIG. 2E
FIG. 2F

COATED FIBER OPTIC PRESSURE SENSOR WITH IMPROVED ACCELERATION RESPONSE

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, DC 20375, USA; +1.202.767.7230; techtran@nrl.navy.mil, referencing NC 210,292-US1.

BACKGROUND OF THE INVENTION

Field of the Invention

This invention relates in general to a fiber optic sensor and more particularly to an active or passive fiber optic sensor.

Description of the Related Art

Specialty coatings on optical fiber have long been used to enhance a fiber's response to various stimuli. These coatings interact with the environment via changes in pressure, electric, magnetic, and temperature fields, for example, and affect various properties of the fiber that can be detected. When these coated fibers are used with interferometric detection schemes, they are capable of making highly sensitive measurements. For some applications such as acoustic sensing, the potentially long interaction lengths afforded by the distributed waveguiding properties of optical fiber enable significant sampling of the signal(s) of interest for improved performance or the ability to perform distributed measurements. Although coating development is fairly mature and prior art has demonstrated acceptable performance capabilities, there is still room for improvement in terms of sensitivity, application of the coating, and operating performance.

Traditionally, mechanical transduction mechanisms rather than coated fibers are preferred due to their simplicity and sensitivity for a particular measurand. For example, airbacked mandrels utilizing wound optical fibers demonstrate extremely high acoustic sensitivity when used in an interferometric configuration. However, the length of fiber required to achieve the desired level of sensitivity (sea state zero or SS0, i.e., 44.5 dB re micoPascal/rt. Hz) is often on the order of 10's to 100's of meters. While small diameter fiber can be used to reduce the size of the mechanical transducer, these devices are relatively large by comparison and place a limit on the size of arrays and geometries of these devices. This is especially true for sensors such as those found in towed arrays for surveillance or seismic applications. Because of the size of the mechanical transducer and the amounts of fibers needed for sufficient sensitivity, the cost and labor involved in manufacturing these devices can be high, leading to an increasingly complex and costly system. Coated fiber sensors provide a much simpler operating geometry with potentially higher response per unit length, thinner transducers, and cost savings due to the ability to extrude coatings onto existing fiber. This additionally reduces the touch labor (e.g., physical handling of the sensor during manufacturing), providing an additional cost savings.

The challenge for the implementation of coated fiber sensors in dynamic environments is that the inherent compliance can result in mechanical resonances that manifest as a false signal at frequencies of interest. For example, with acoustic sensors in towed array configurations, these unwanted responses originate from vibrations caused by acceleration and deceleration of the cable. Mechanical transducers have the advantage of being able to tailor the sensor design to limit these resonances thereby reducing the acceleration sensitivity. The reduction can be accomplished by using stiffer materials, reducing the length of fiber, or modifying the geometry by placing the hydrophone in a push-pull configuration whereby each half of the sensor responds to acceleration oppositely so that any effect is canceled. Regrettably, coated fiber sensors do not have the luxury of using stiffer materials since compliance must be maintained, long continuous lengths are needed to ensure the required sensitivity is met, and deviating away from a linear configuration increases the complexity of the sensor. Nevertheless, there is still considerable interest in utilizing coated fiber sensors due to their simplicity and compact nature when compared to bulkier mechanical transducers.

BRIEF SUMMARY OF THE INVENTION

An embodiment of the invention includes an active apparatus. The active apparatus includes a pressure sensor array. The pressure sensor array includes at least one transducer and a standard optical fiber mechanically coupled thereto. The active apparatus includes a distributed Bragg reflector fiber laser located within the optical fiber. The fiber laser emits a wavelength. The fiber laser consists of two fiber Bragg gratings, which define a linear cavity. The linear cavity is mechanically coupled to the at least one transducer. A pressure change detected by the at least one transducer causes at least one property change in the optical fiber. For example, the at least one property change in the optical fiber causes a change in the cavity length. The change in the cavity length causes a wavelength shift relative to the wavelength emitted by the fiber laser.

Another embodiment of the invention includes a passive apparatus. The passive apparatus includes a pressure sensor array. The pressure sensor array includes at least one coated hydrophone. The at least one coated hydrophone includes at least one transducer. The at least one transducer includes an acoustic-pressure-sensitive material. The passive apparatus includes an optical fiber mechanically coupled to the at least one transducer. The optical fiber includes a center and an axis. Each coated hydrophone includes a plurality of reinforcing members in the acoustic-pressure-sensitive material; the plurality of reinforcing members is arranged along the axis and at a distance from the center, wherein the acoustic-pressure-sensitive material coats the optical fiber.

An embodiment of the invention overcomes the challenge of inherent compliance of coated fiber sensors in dynamic environments resulting in mechanical resonances that manifest as a false signal at frequencies of interest. Because it is simpler and more compact than commercially available alternatives, coated fiber sensor technologies including the embodiment of the invention have wider applications.

An embodiment of the invention reduces the acceleration sensitivity of coated fiber optic pressure sensors, e.g. hydrophones, while maintaining compliance sufficient for sensing applications. The improvement in the response is, for example, facilitated by incorporating axially aligned carbon fiber tubes radially distributed within the coating to increase axial rigidity. An embodiment of the invention beneficially impacts applications in which hydrophone bodies are towed and require reduced acceleration sensitivity caused by drag or pulling on tow cables. Further, because an embodiment of the invention can be made at reduced diameters and extended lengths compared to existing hydrophone designs, the embodiment of the invention improves the response of the sensor to flow-induced noise. An embodiment of the invention also details various design parameters that promote single longitudinal mode lasing in coated sensors including distributed Bragg reflector ("DBR") fiber lasers.

BRIEF DESCRIPTION OF THE DRAWINGS

FIGS. 2A is a block diagram of a transducer according to an embodiment of the invention, the transducer including an optical fiber coating.

FIGS. 2B is a block diagram of a transducer according to an embodiment of the invention, the transducer including a mandrel.

FIGS. 2C is a block diagram of a transducer according to an embodiment of the invention, the transducer including a diaphragm.

FIGS. 2D is a block diagram of a transducer according to an embodiment of the invention, the transducer including a cantilever.

FIG. 2E is a block diagram of a transducer according to an embodiment of the invention, the transducer including a piston.

FIGS. 2F is a block diagram of a transducer according to an embodiment of the invention, the transducer including a bending beam.

DETAILED DESCRIPTION OF THE INVENTION

Figure 1:
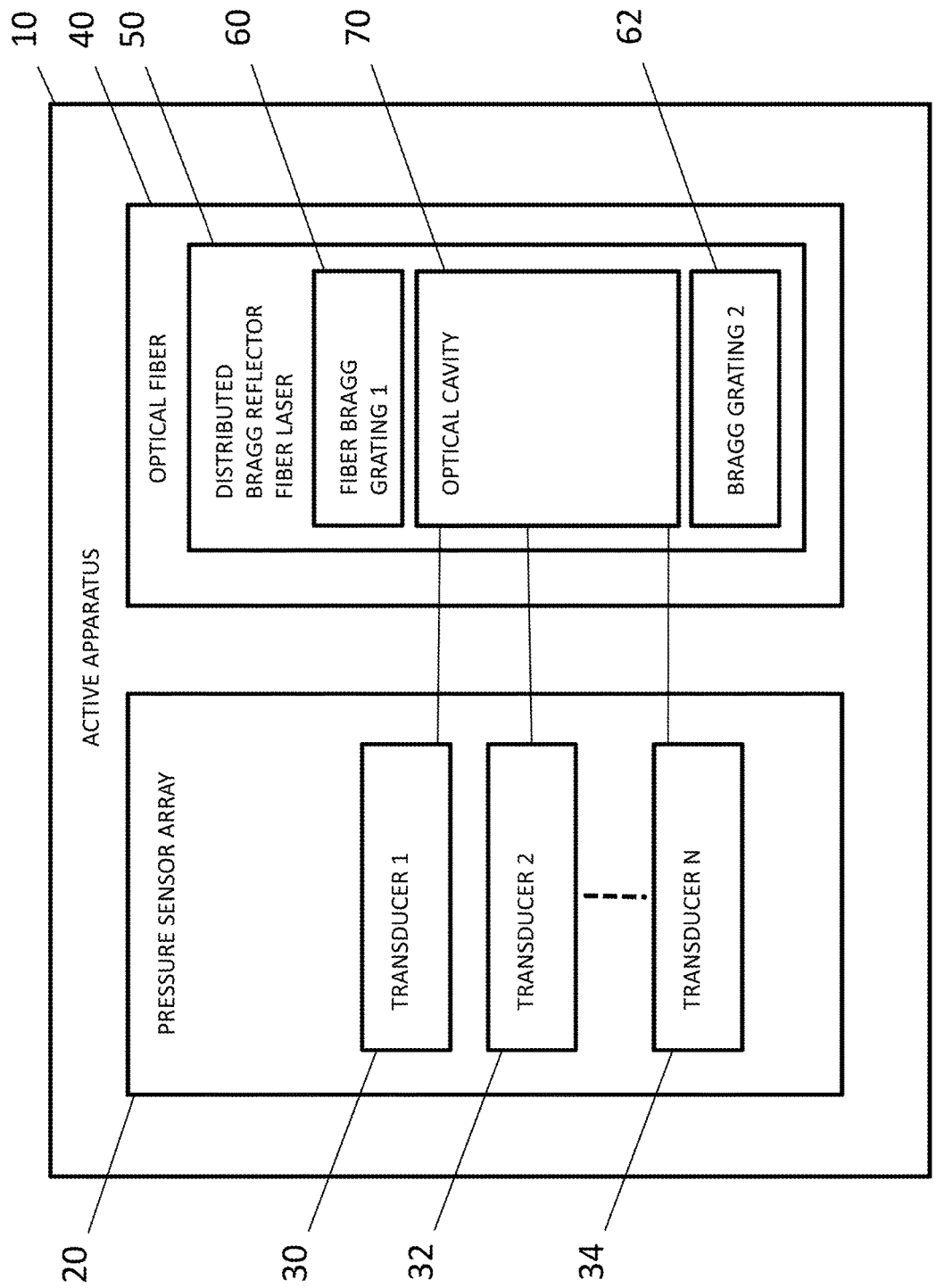
FIG. 1 is a block diagram of an active apparatus according to an embodiment of the invention.
Figure 3B:
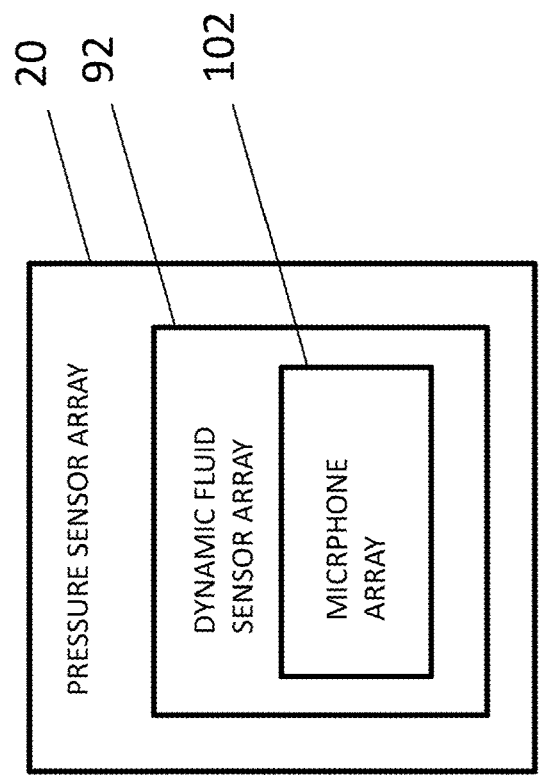
FIGS. 3B is a block diagram of a dynamic fluid sensor array according to an embodiment of the invention, the dynamic fluid sensor array including a microphone array.
Figure 3A:
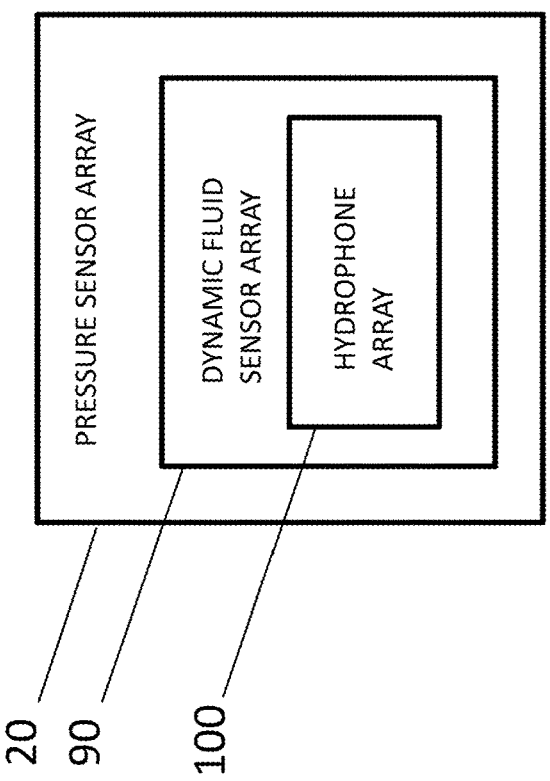
FIGS. 3A is a block diagram of a dynamic fluid sensor array according to an embodiment of the invention, the dynamic fluid sensor array including a hydrophone array.
Figure 4B:
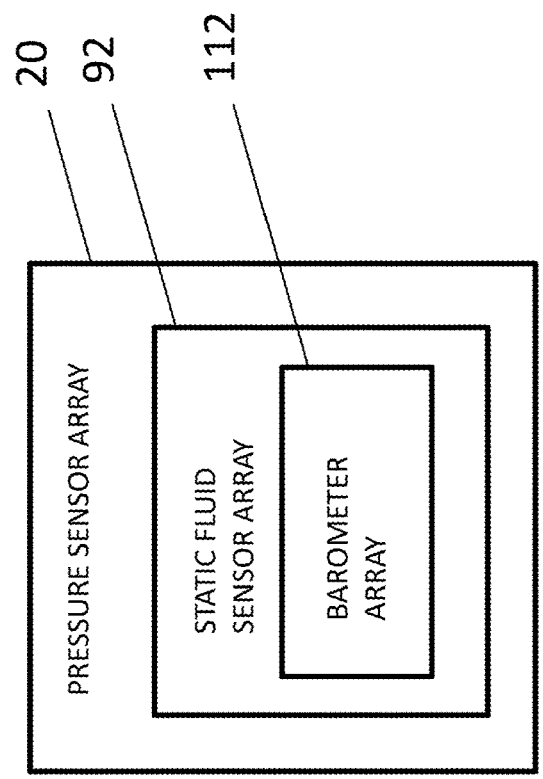
FIGS. 4B is a block diagrams of a static fluid sensor array according to an embodiment of the invention, the static fluid sensor array including a barometer array.
Figure 4A:
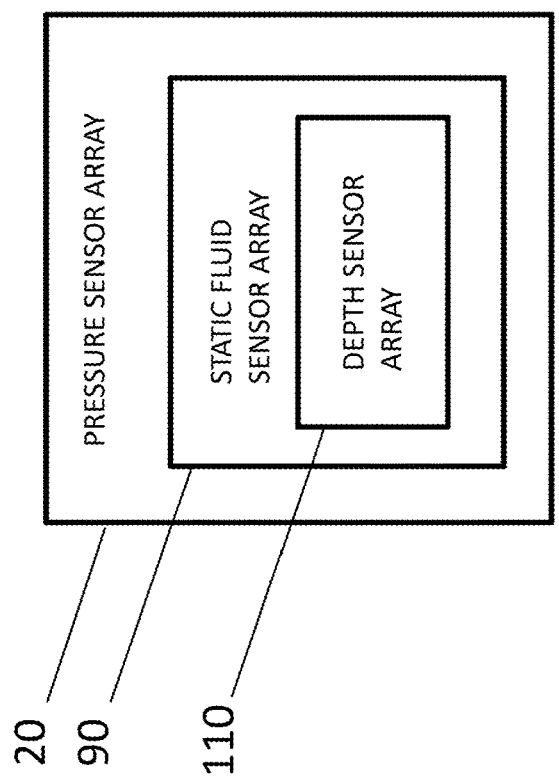
FIGS. 4A is a block diagrams of a static fluid sensor array according to an embodiment of the invention, the static fluid sensor array including a depth sensor array.

An embodiment of the invention includes an active apparatus 10, as shown by way of illustrative example in FIG. 1. For example, in fiber optic apparatuses, the term "active" implies that optical fibers therein have amplifying properties. Such optical fibers, for example, include rare-earth-doped optical fibers. The optical fibers in an active fiber optic apparatus are capable of producing stimulated emission, when the fibers are pumped by a standard light source, e.g., a diode laser. These optical fibers serve as the gain medium for fiber lasers. The active apparatus 10 includes a pressure sensor array 20. The pressure sensor array 20 includes at least one transducer 30, 32, 34, that is, one or more transducers. The active apparatus 10 includes a standard optical fiber 40 mechanically coupled to the at least one transducer 30, 32, 34. The active apparatus 10 includes a distributed Bragg reflector fiber laser 50 located within the optical fiber 40. The fiber laser 50 emits a wavelength. The wavelength, for example, is an unstrained wavelength. The fiber laser 50 consists of two fiber Bragg gratings 60, 62. The two fiber Bragg gratings 60, 62 define a standard linear cavity 70. In an embodiment of the invention, the linear cavity 70 includes a standard single longitudinal mode, single-polarization linear cavity. In another embodiment of the invention, the linear cavity 70 includes a standard single longitudinal mode, dual-polarization linear cavity. In another embodiment of the invention, the linear cavity 70 includes a standard multi-mode, single-polarization linear cavity. In another embodiment of the invention, the linear cavity 70 includes a standard multi-mode, dual-polarization linear cavity. The linear cavity 70 includes a cavity length greater than 3 cm. The linear cavity 70 is mechanically coupled to the at least one transducer 30. 32, 34. A pressure change experienced by the at least one transducer 30, 32, 34 causes at least one property change in the optical fiber 40. The at least one property change, for example, includes a physical property change. Examples of the at least one physical property change include at least one change in volume and/or at least one change in refractive index. For example, the at least one physical property change in the optical fiber 40 causes a change in the cavity length. The change in the cavity length causes a wavelength shift relative to the unperturbed, or unstrained, wavelength emitted by the fiber laser 50.

Optionally, the two fiber Bragg gratings 60, 62 include independent refractive index profiles, independent grating lengths, and/or independent grating periods. For the purpose of this patent application, a fiber Bragg grating includes a refractive index profile, which is defined as a pseudo-sinusoidal variation in the refractive index along the optical fiber's length within which the fiber Bragg grating resides. This refractive index is referenced by an index modulation amplitude (i.e., AC index) and average index (i.e., DC index). The index profile is, for example, spatially varying to permit tapering and shaping of the grating's reflection spectrum. The index modulation amplitude describes the strength of the grating (i.e., its reflectivity) and the average index (i.e., its spatially averaged index profile) contributes to defining the reflecting wavelength of the grating. The Bragg wavelength is also determined by the pitch or period of the grating. For example, the pitch or period of the grating is spatially varying. Chirp or phase modifications created by altering the local Braga wavelength or introducing discrete phase shifts to the refractive index profile introduce spectral features or adjust the bandwidth of the grating spectra. The bandwidth of the spectra as well as the grating's strength are also affected by the length of the grating profile. In an embodiment of the invention, each grating has its own refractive index profile, which may include differing values of these parameters to produce a desired combined reflection spectrum that promotes a single longitudinal mode. That is, for the purpose of this patent application, independent refractive index profiles then mean that, in a linear cavity 70 according to an embodiment of the invention, the Bragg gratings 60, 62 have respective refractive index profiles. For the purpose of this patent application, independent grating lengths mean that, in a linear cavity 70 according to an embodiment of the invention, the Bragg gratings 60, 62 have respective grating lengths. For the purpose of this patent application, independent grating periods mean that, in a linear cavity 70 according to an embodiment of the invention, the Bragg gratings 60, 62 have respective grating periods.

Optionally, in an embodiment of the invention, the Bragg gratings 60, 62 are protected from variations in the environment. If both Bragg gratings are subjected to the same environment, then their spectra move in tandem, and there is only a DC variation in a reported signal. For an embodiment of the invention including hydrophones, for example, AC signals are of interest, and the interferometric signal rejects the DC term. In an embodiment of the invention, for example, the DC term is tracked, which is advantageous for static pressure monitoring applications. In an embodiment of the invention including standard multiplexed, multiple lasers, for example, a standard demultiplexer filters individual wavelengths. If the Bragg wavelength shifts too far, it shifts to the next channel in the demultiplexer. In an embodiment of the invention, for example, the gratings are fixed in wavelength, by constraining strain and temperature changes to the gratings, to prevent inadvertent motion of the gratings. For example, constraining strain and/or temperature changes to the gratings is achieved, for example, via standard insulation techniques and/or standard athermalization techniques.

Optionally, as shown by way of illustration in FIGS. 2A-2F, the at least one transducer 30, 32, 34 includes a standard coating 80 for the optical fiber, a standard mandrel 82, a standard diaphragm 84, a standard cantilever 86, a standard piston 88, or a standard bending beam 89. For ease of understanding and not for the purpose of limiting the scope of invention, FIGS. 2A-2F only show one transducer 34 of the at least one transducer 30, 32, 34.

Figure 5:
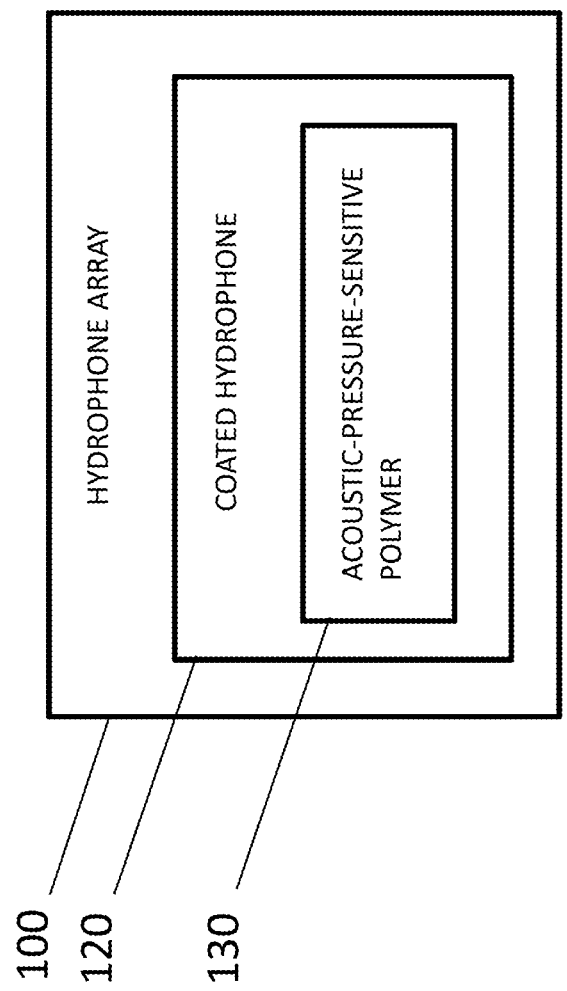
FIG. 5 is a block diagram of a coated hydrophone according to an embodiment of the invention.
Figure 6A:
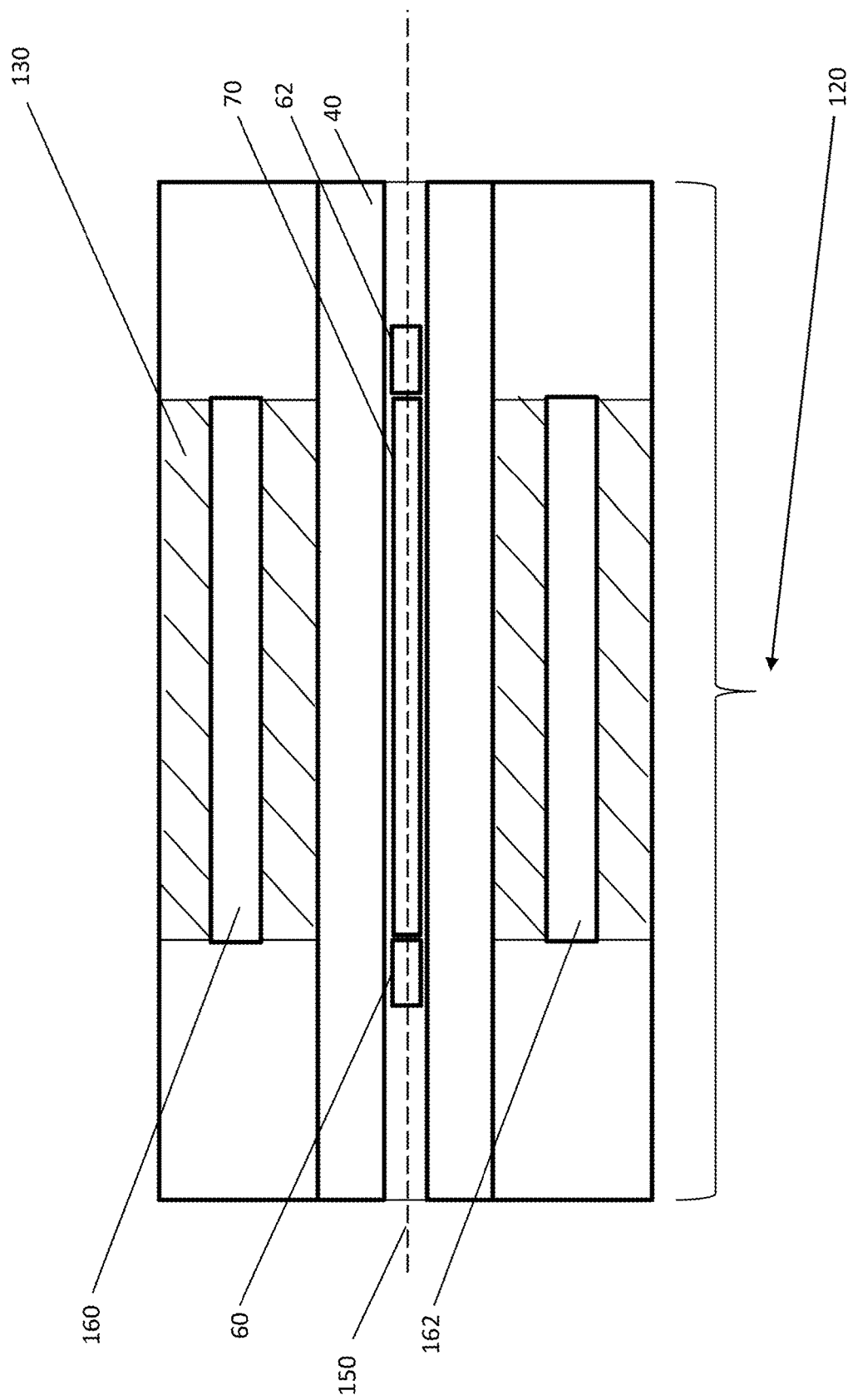
FIG. 6A is a cross-sectional axial view of an embodiment of the invention including straight reinforcing members.
Figure 6B:
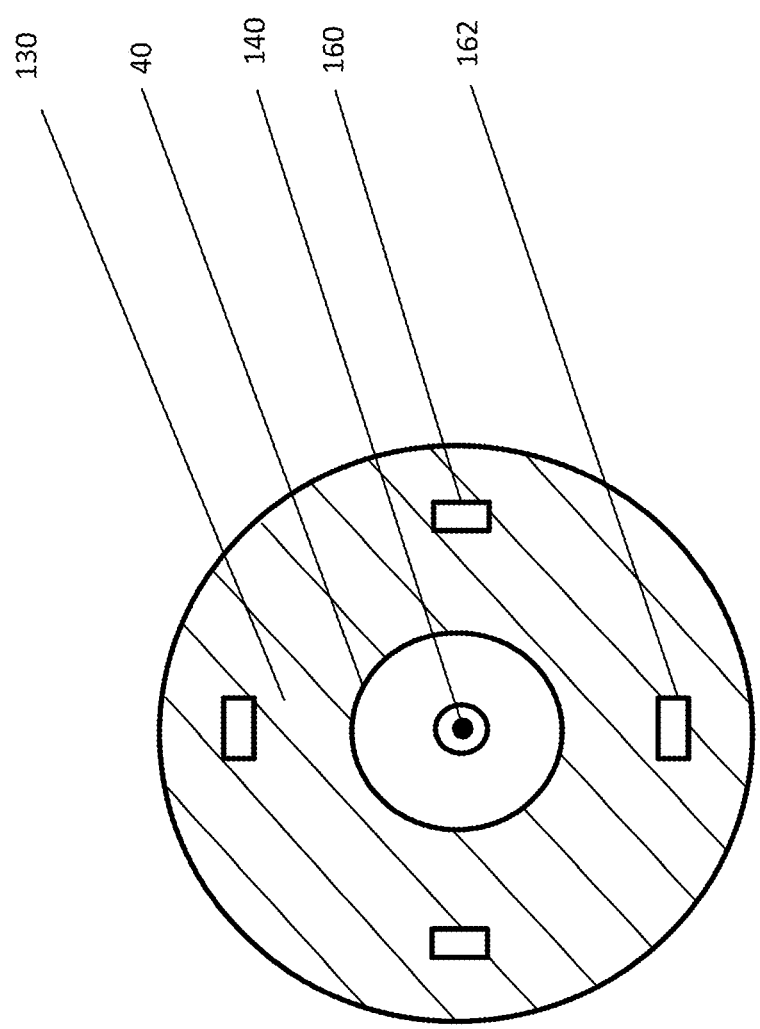
FIG. 6B is a cross-sectional transverse view of an embodiment of the invention including straight reinforcing members.

Optionally, as shown by way of illustration in FIGS. 3A-3B and FIGS. 4A-4B, the pressure sensor array 20 includes a standard dynamic fluid sensor array 90 or a standard static fluid sensor array 92. Optionally, as shown by way of illustration in FIGS. 3A-3B, the dynamic fluid sensor array 90 includes a standard hydrophone array 100 or a standard microphone array 102. Optionally, as shown by way of illustration in FIGS. 4A-4B, the static fluid sensor array 92 includes a standard depth sensor array 110 or a standard barometer array 112. Optionally, as shown by way of illustration in FIG. 5, the hydrophone array 100 includes at least one coated hydrophone 120. The coated hydrophone 120 includes a standard acoustic-pressure-sensitive material 130. For example, the acoustic-pressure-sensitive material 130 includes a standard acoustic-pressure-sensitive polymer. The acoustic-pressure-sensitive material 130 coats the optical fiber 40 around the linear cavity 70, as shown by way of illustration in. FIGS. 6A-6B. Optionally, as shown by way of illustration in FIG. 7A, a standard acoustic-pressure-insensitive material 180 coats at least a portion of the optical fiber 10 beyond the linear cavity 70. The acoustic-pressure-insensitive material 180 is optionally non-compliant. For example, such a non-compliant, acoustic pressure-insensitive material 180 includes a standard acoustic-pressure-insensitive polymer with a high Young's modulus and/or a high durometer. Other examples of a non-compliant acoustic-pressure-insensitive material 180 include standard metals, such as nickel or aluminum, or standard glasses with different bulk moduli, such as calcium aluminate glass.

Optionally, as shown by way of illustration in FIGS. 6A-6B and FIGS. 7A-7B, the optical fiber 40 includes a center 140 and an axis 150. Each coated hydrophone of the at least one coated hydrophone 120 includes a plurality of reinforcing members being arranged in the acoustic-pressure-sensitive material 130 around the linear cavity 70 at a distance from the optical fiber's center 140 and the optical fiber's axis 150. One of ordinary skill in the art will readily appreciate that the number of reinforcing members in the plurality of reinforcing members depend on the application. The number of reinforcing members shown in FIGS. 6A-6B and 7A-B are only for illustration and ease of understanding purpose, not for limiting the scope of the invention. In an embodiment of the invention, for example, the plurality of reinforcing members is arranged in the acoustic-pressure-sensitive material 130 parallel to the axis 150 of the optical fiber. In another embodiment of the invention, the plurality of reinforcing members is arranged in the acoustic-pressure-sensitive material 130 skewed toward or away from the axis 150. For example, in an embodiment of the invention, the plurality of reinforcing members is symmetrically arranged around the center 140 of the optical fiber 40. For example, in another embodiment of the invention, the plurality of reinforcing members is asymmetrically arranged around the center 140 of the optical fiber 40.

Figure 7A:
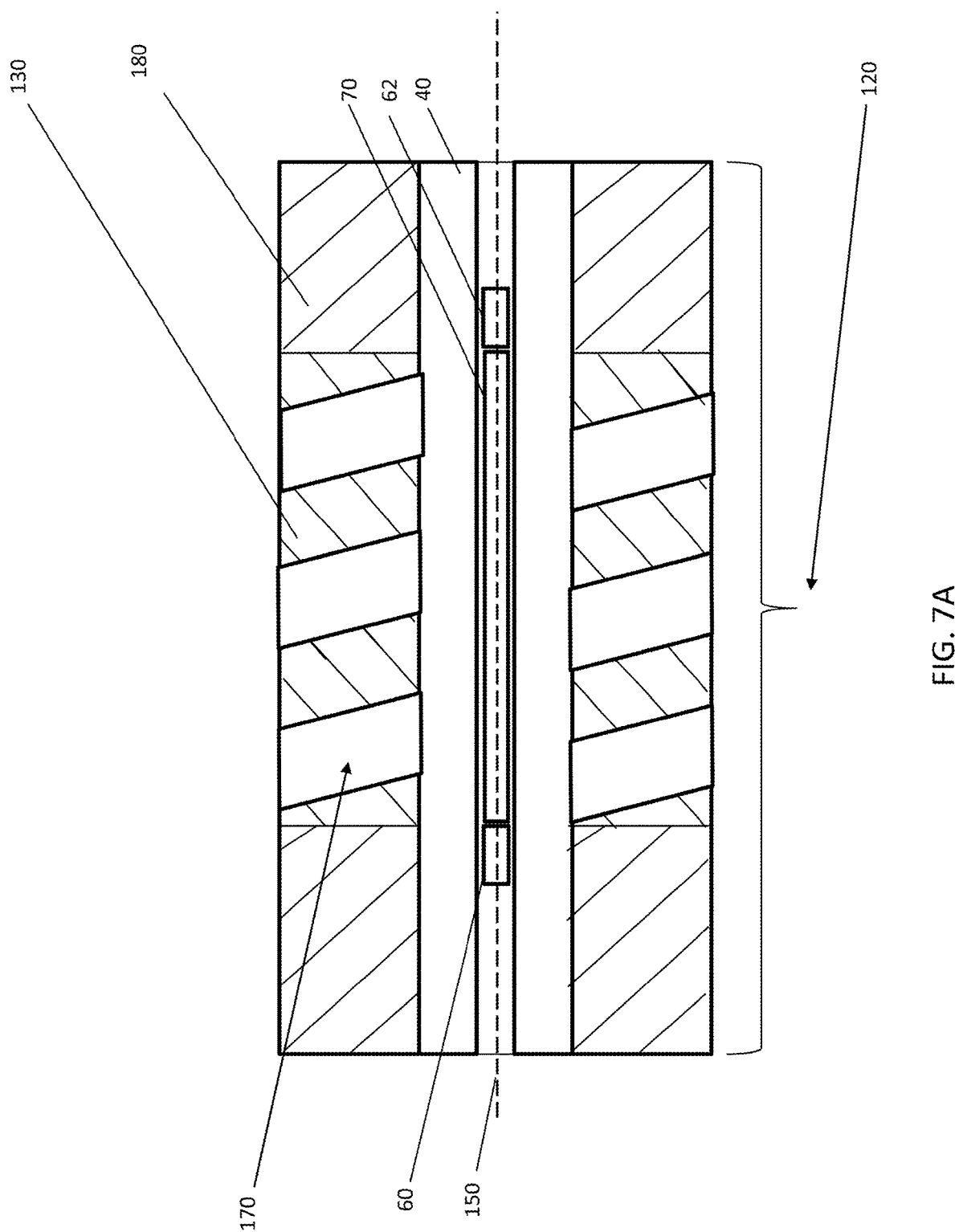
FIG. 7A is a cross-sectional axial view of an embodiment of the invention including helical reinforcing members.
Figure 7B:
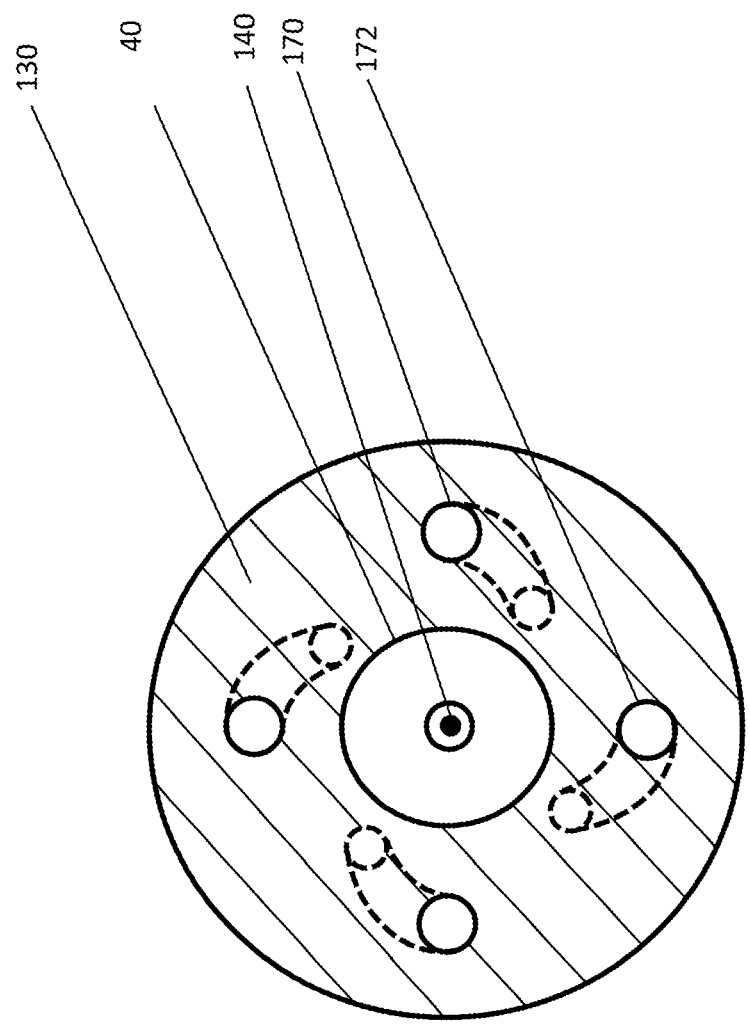
FIG. 7B is a cross-sectional transverse view of an embodiment of the invention including helical reinforcing members.
Figure 8C:
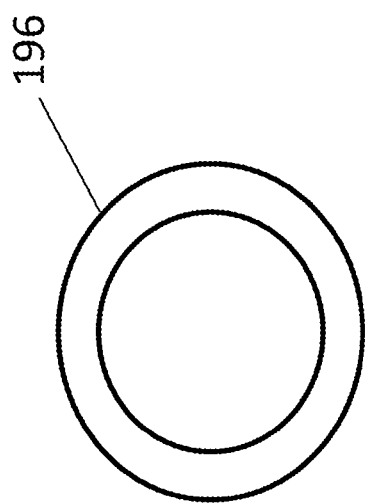
FIG. 8C is a cross-sectional transverse view of a reinforcing member according to an embodiment of the invention, the reinforcing member including an elliptical cross-section.
Figure 8D:
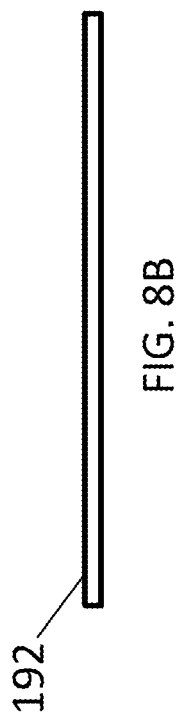
FIG. 8D is a cross-sectional transverse view of a reinforcing member according to an embodiment of the invention, the reinforcing member including a tubular cross-section.
Figure 8A:
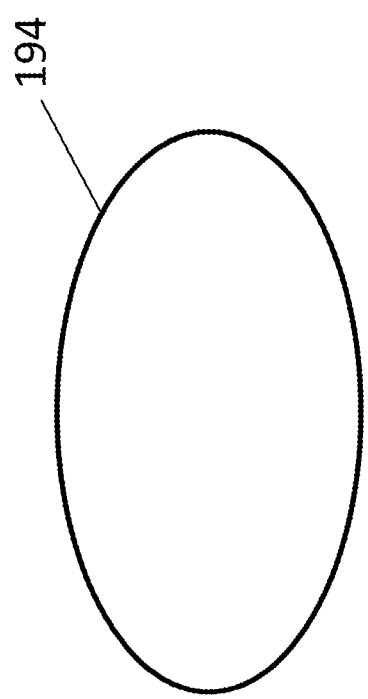
FIG. 8A is a cross-sectional transverse view of a reinforcing member according to an embodiment of the invention, the reinforcing member including a rectangular cross-section.
Figure 8B:
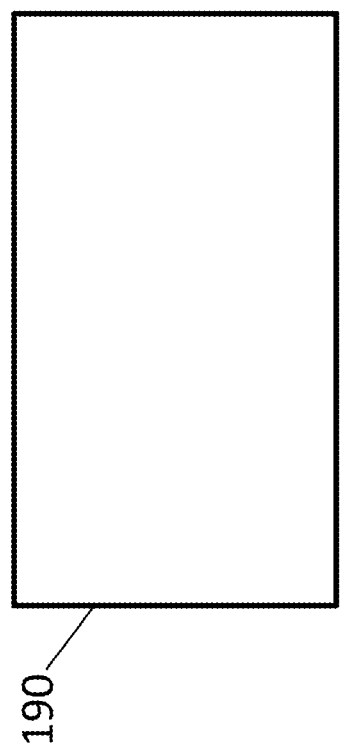
FIG. 8B is a cross-sectional transverse view of a reinforcing member according to an embodiment of the invention, the reinforcing member including a planar cross-section.
Figure 9A:
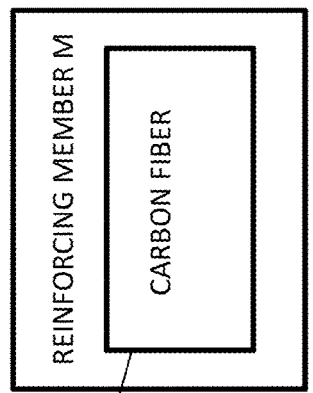
FIG. 9A is a block diagram of a reinforcing member according to an embodiment of the invention, the reinforcing member including carbon fiber.
Figure 9B:
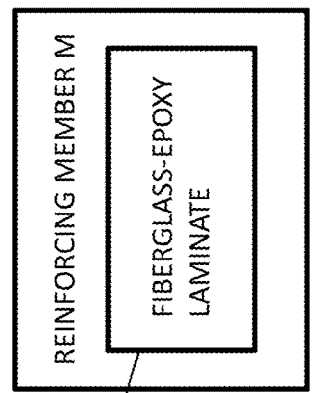
FIG. 9B is a cross-sectional transverse view of a reinforcing member according to an embodiment of the invention, the reinforcing member including fiberglass-epoxy laminate.
Figure 9C:
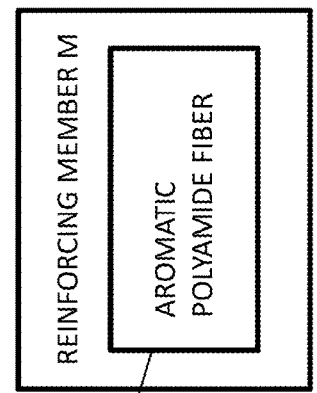
FIG. 9C is a cross-sectional transverse view of a reinforcing member according to an embodiment of the invention, the reinforcing member including aromatic polyamide fiber.

Optionally, each reinforcing member of the plurality of reinforcing members includes a reinforcing member length and a reinforcing member cross-sectional width. For example, in an embodiment of the invention, the reinforcing member length is greater than the reinforcing member cross-sectional width. Optionally, in an embodiment of the invention, each reinforcing member is straight. An embodiment of the invention including straight reinforcing members is shown by way of illustration in FIGS. 6A-6B. For ease of understanding, although four straight reinforcing members are shown in FIG. 6B, only two straight reinforcing members 160, 162 are labeled. Optionally, in an embodiment of the invention, each reinforcing member is helical relative to the axis 150. An embodiment of the invention including helical reinforcing members is shown by way of illustration in FIGS. 7A-7B. For ease of understanding, FIG. 7A shows and labels only one helical reinforcing member 170. For ease of understanding, FIG. 7B shows four helical reinforcing members, but labels only two helical reinforcing members 170, 172. Optionally, as shown in FIGS. 8A-8D, each reinforcing member includes a rectangular cross-section 190, a planar cross-section 192, an elliptical cross-section 194, or a tubular cross-section 196. Although only a rectangular cross-section is shown in FIG. 8A, one of ordinary skill in the art will readily appreciate that other polygonal cross-sections are optionally included in alternative embodiments of the invention. One of ordinary skill in the art will further readily appreciate that a reinforcing member having a planar cross-section, as shown in FIG. 8B, is akin to the cross-section of a standard ply. One of ordinary skill in the art will additionally readily appreciate that an embodiment of the invention including a reinforcing member having an elliptical cross-section, for example, includes a reinforcing member having a circular cross-section. Optionally, as shown by way of illustration in FIGS. 9A-9C, each reinforcing member includes carbon fiber 200, a fiberglass-epoxy laminate 202, or an aromatic polyamide fiber 204. Illustrative embodiments of the fiberglass-epoxy laminate 202 include standard FR4 fiber-glass-reinforced resin fiber and standard G10 fiber-glass-reinforced resin fiber, such as those characterized by the Garolite brand name. Optionally, the coated hydrophone 120 includes a standard acoustic-pressure-insensitive material 180. For example, the acoustic-pressure-insensitive material 180 includes a standard acoustic-pressure-insensitive polymer. The optical fiber 40 includes at least one linear-cavity-free length. The acoustic-pressure-sensitive material 180 coats the optical fiber 40 around the at least one linear-cavity-free length.

Figure 10:
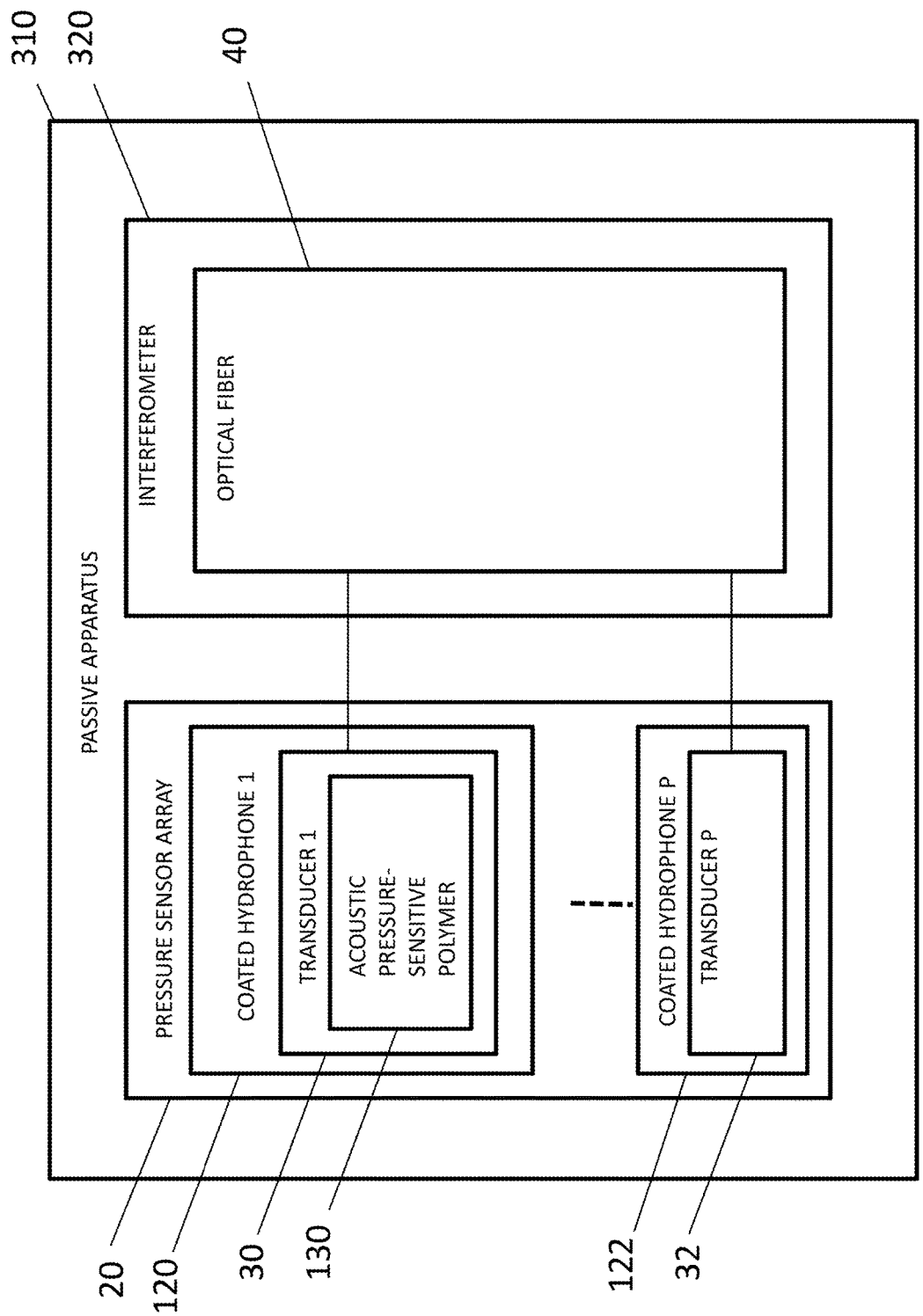
FIG. 10 is a block diagram of a passive apparatus including an interferometer according to an embodiment of the invention.
Figure 11:
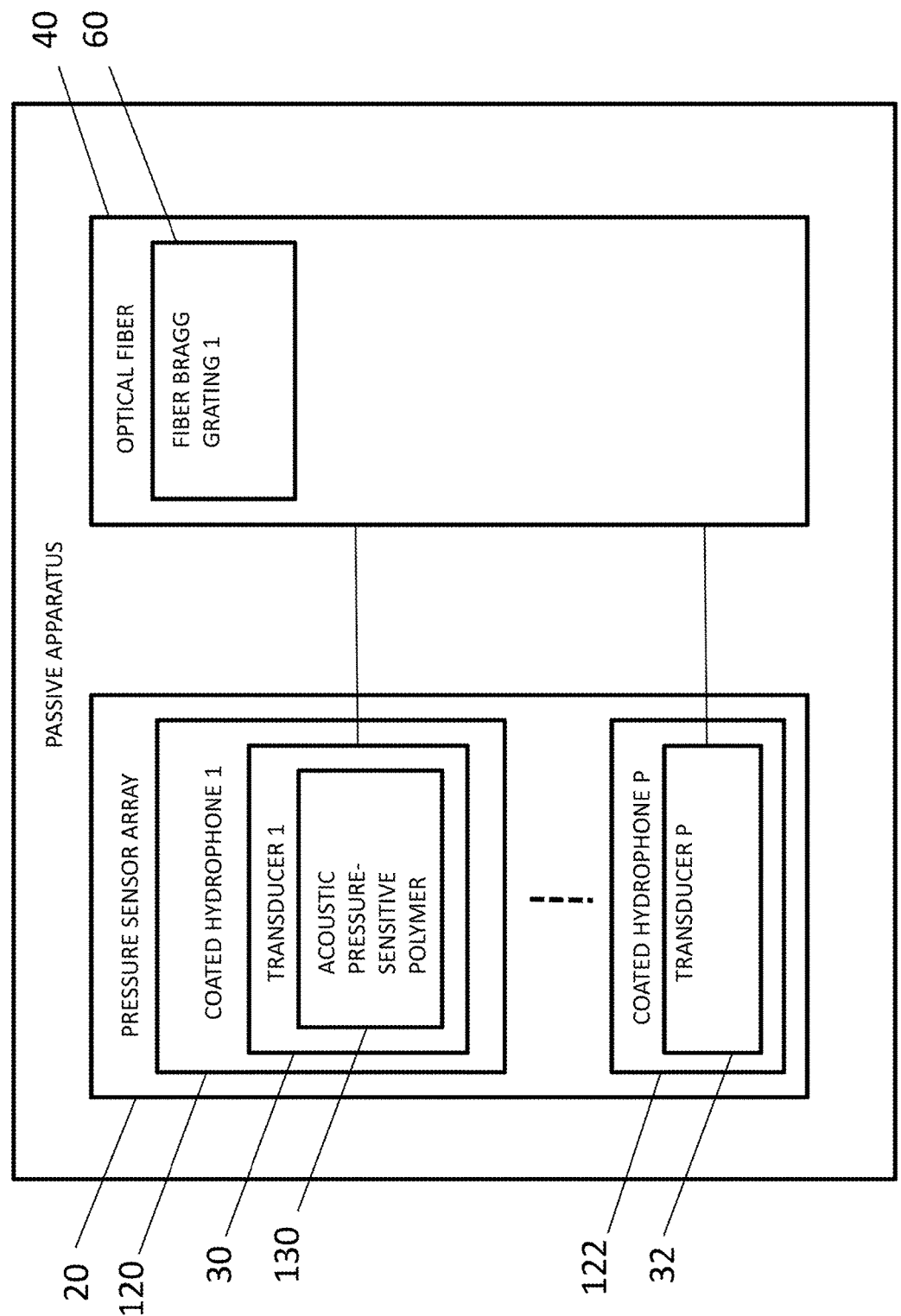
FIG. 11 is a block diagram of a passive apparatus including an optical fiber with a fiber Bragg grating according to an embodiment of the invention.
Figure 12:
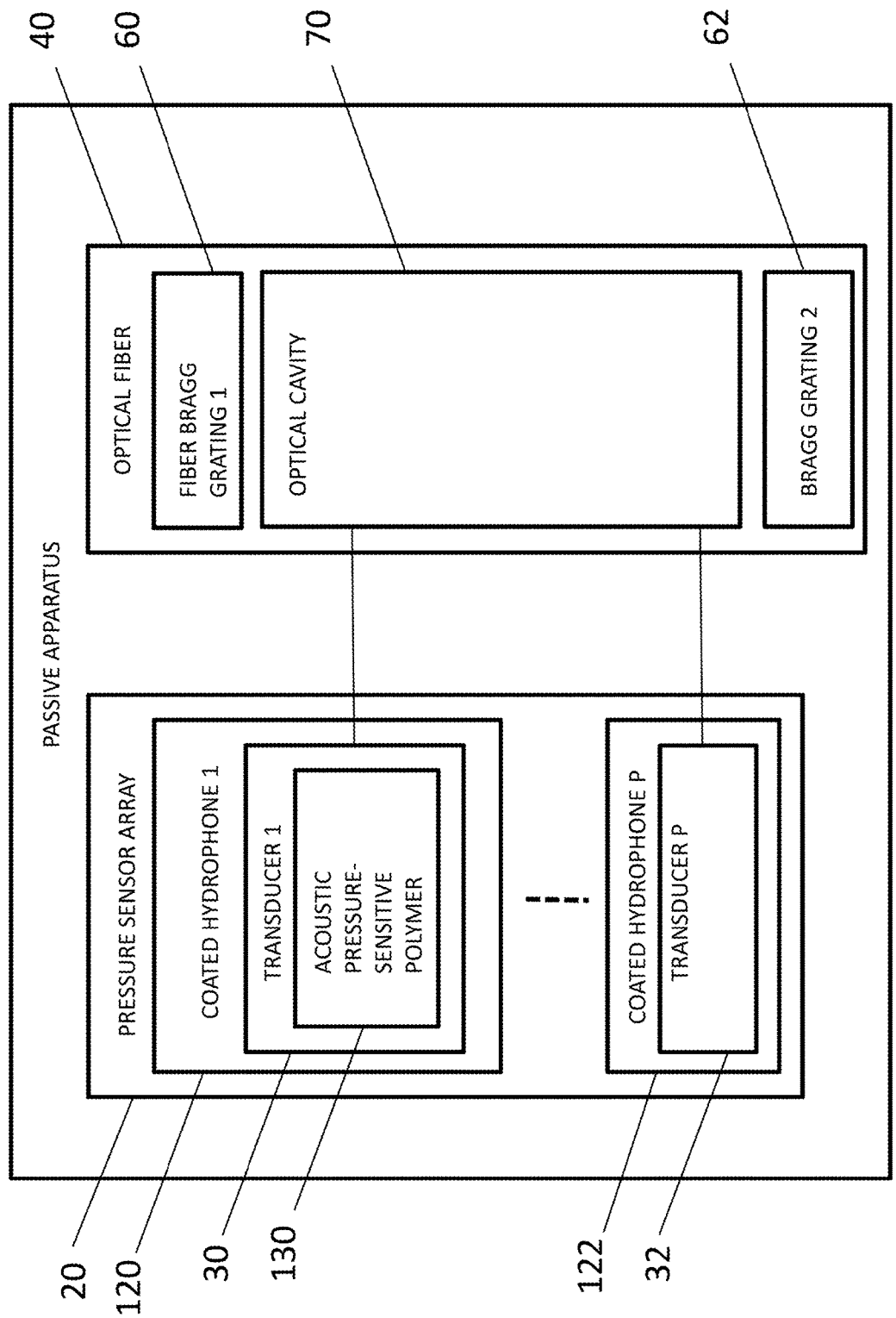
FIG. 12 is a block diagram of a passive apparatus including two fiber Bragg gratings defining an optical cavity according to an embodiment of the invention.

Another embodiment of the invention includes a passive apparatus 310, such as shown by way of illustration in FIGS. 10-12. In fiber optic apparatuses, for example, passive optical fibers do not support amplification, when pumped by a standard light source, e.g., a diode laser. In fiber optic apparatuses, for example, passive optical fibers are capable of transmitting light, but not amplifying light. Because there are no active dopants in the glass of the passive optical fibers, amplification of a light signal transmitted therethrough cannot occur under normal operating conditions. The passive apparatus 310 includes a pressure sensor array 20. The pressure sensor array 20 includes at least one coated hydrophone 120, 122. The at least one coated hydrophone 120, 122 includes at least one transducer 30, 32. That is, each coated hydrophone includes a respective transducer. The at least one transducer 30, 32 includes an acoustic-pressure-sensitive material 130. The passive apparatus 310 includes an optical fiber 40 mechanically coupled to the at least one transducer 30, 32. For example, the optical fiber 40 includes glass free of one or more active dopants that would otherwise support amplification of a signal being transmitted through the optical fiber. The optical fiber 40 includes a center 140 and an axis 150. Each coated hydrophone 120, 122 includes a plurality of reinforcing members in the acoustic-pressure-sensitive material 130; the plurality of reinforcing members is arranged along the axis 150 and at a distance from the center 140, wherein the acoustic-pressure-sensitive material 130 coats the optical fiber 40.

Optionally, each reinforcing member of the plurality of reinforcing members includes a reinforcing member length and a reinforcing member cross-sectional width. The reinforcing member length is greater than the reinforcing member cross-sectional width.

Optionally; the each reinforcing member is one of straight and helical relative to the axis. The each reinforcing member includes a rectangular cross-section, an elliptical cross-section, a planar cross-section, or a tubular cross-section.

Optionally, the each reinforcing member includes carbon fiber, a fiberglass-epoxy laminate, or an aromatic polyamide fiber.

Optionally, the passive apparatus 310 further includes an interferometer 320. The interferometer 320 includes the optical fiber 40, such as shown by way of illustration in FIG. 10.

Optionally, the passive apparatus 310 further includes a fiber Bragg grating 60 in the optical fiber 40, such as shown by way of illustration in FIG. 11. For example, the fiber Bragg grating includes a standard π-phase-shifted grating or a standard fiber Bragg grating having an apodized or unapodized reflection spectrum.

Optionally, the passive apparatus 310 further includes two fiber Bragg gratings 60, 62 in the optical fiber 40, such as shown by way of illustration in FIG. 12. The two fiber Bragg gratings 60, 62 define a linear cavity 70. The linear cavity 70 includes a cavity length greater than 3 cm. The linear cavity 70 is mechanically coupled to the at least one transducer 30, 32. Optionally, the two fiber Bragg gratings include independent refractive index profiles, independent grating lengths, and/or independent grating periods.

In another embodiment of the invention, to improve the acceleration sensitivity of coated fiber optic sensors, reinforcement of the acoustic-pressure-sensitive polymer coating is provided using internal strength, or reinforcing, members radially distributed along the fiber's length. The strength members serve to stiffen the transducer and limit its motion. The design of the transducer according to an embodiment of the invention is analogous to reinforced concrete, wherein steel rods are used to provide added tensile strength. The number and radial placement of the strength members is, for example, adjusted, as can the material and geometry used to reinforce the polymer, in an effort to tailor the response of the sensor for a particular application. The polymer matrix of the acoustic-pressure-sensitive polymer coating comprises the bulk of the transducer and is, for example, also adjusted depending on the pressure sensitivity required. Additionally, the inclusion of strength members optionally alters the frequency response, making the sensor more or less responsive in certain frequency bands depending on the material used.

The acoustic-pressure-sensitive coating used to surround the optical fiber is, for example, a standard polymeric material or standard thermoplastic material with sufficient compliance such that when compressed, the desired displacement for a given pressure is achieved. For a single coating layer, the influence of the fiber is negligible and the pressure response is largely determined by the coating. For thick coatings (typically >1 mm), the responsivity is inversely proportional to the bulk modulus. The highest responsivity is achieved for materials with both low Young's modulus and bulk modulus, yielding a low Poisson's ratio. The sensitivity of the transducer can be enhanced by incorporating standard microspheres made of glass or polymer and filled with air or fluorocarbons into the polymer matrix (sometimes called "micro-balloons"), creating a syntactic foam or cellular pressure release material. Through the inclusion of these microspheres, the bulk modulus of the base material decreases, allowing for more compressibility and compliance. Layers of various coatings are optionally employed in alternative embodiments of the invention to change the sensitivity, dynamic range, enhance certain frequency bands, or act as an acoustic filter.

To increase the rigidity of the coating, a number of strength members can be embedded into the base material. For linear transducers, longitudinal, strength members are, for example, employed. For planar sensors, planes of strength members are, for example, used, in a manner similar to the plies in carbon fiber reinforced polymers. Illustrative materials for the strength members according to embodiments of the invention include standard materials with an elastic modulus greater than the base matrix, such as metals, plastics, or fiber reinforced composites. The cross-section of the strength member is optionally adjusted to customize the properties of the transducer depending on the application. For the same outer diameter, rods are axially stronger than hollow tubes, but can weigh considerably more. This may place an increased load, which may be undesirable, on support handling equipment. The relative location(s) of the strength members depends on the application and should be such that it provides an optimized response. For example, strength members placed near the optical fiber will limit the pressure response of the base matrix due to the close proximity of the structural reinforcement.

In an embodiment of the invention, the coated fiber sensor is formed, using a split mold to form the transducer. Any standard cross-sectional geometry is optionally used for the sensor (e.g., planar, cylindrical, or rectangular) depending on the intended application. For a linear transducer, a cylindrical cross-section is typically employed for an omni-directional response, though it is recognized that other geometries might be preferable if rejection along an axis is desired or the optical fiber used has an asymmetry to be exploited (such as with polarization maintaining fiber). A suitable mold is easily designed using modem computer aided design. ("CAD") software and fabricated using a variety of manufacturing methods (e.g. 3D printed or ported to a computer numerical control ("CNC") milling machine). Standard features, such as fill ports, registration features, or fiber grooves, are optionally added before or after the mold has been fabricated, depending on the manufacturing process used. For reinforced transducers, holes are spaced radially around the central axis at each mold end to register the strength members within the mold. Although each end of the mold typically includes a corresponding hole directly opposite, this is not a requirement in all embodiments of the invention. Prior to injecting the coating, the strength members are placed into the holes. The holes are, for example, made sufficiently deep to allow the strength member to slide in one end, then retract into the opposite. Alternatively, flexible rods or tubes such as those made from pultruded carbon fiber can be secured on one end, then bent into the opposite hole. Once the strength members are secured, the optical fiber is set into the mold and the mold sealed. Finally, the coating is injected into the mold and cured according to the type of material used. After curing, the mold is released, and the transducer extracted. The fiber sensor is then capable of being put into service using a variety of interrogation technique and sensor systems. Alternatively, the coating is sequentially layered and cured in stages, allowing the strength members to be placed in situ during the curing process.

In an embodiment of the invention, the optical fiber 40 used for the sensor includes any standard fiber design and standard material available. For most applications, single mode fiber with a cladding diameter of 50 to 125 micrometers is acceptable, though one of ordinary skill in the art will readily appreciate that other fiber types and materials are optionally preferred for specific applications or interrogation techniques. The length of the optical fiber is, for example, dependent upon the application and the sensitivity needed for the measurement. For interferometric sensors, this length is, for example, 10's to 100's of meters. Sensors using fiber gratings are optionally used, when pressure signals of interests are quasi-static or static, or the fiber grating interrogation system permits measurement of dynamic signals. Alternatively, a sensor based on a standard fiber laser achieves a similar response to interferometric systems in a fraction of the length. The shorter length of a sensor based on a fiber laser is also advantageous as it can reduce the sensitivity to acceleration through the use of smaller transducers. For grating-based sensors, the grating is typically isolated so that the coating contacts only the ends of the gratings. Therefore, when the coating is subjected to a pressure field, the grating is strained, but there is no transfer from the coating to the grating directly. Similarly, for sensors based on resonant cavities, such as a pair of gratings that form a Fabry-Perot cavity, the coating is only in intimate contact with the cavity (and not the gratings) to prevent distortion of the grating spectra. Specialized coatings, voids, or tubing placed within the coating optionally reduce the pressure sensitivity and serve to isolate the fiber Bragg gratings.

In an embodiment of the invention, fiber lasers are utilized with mechanical transducers to achieve a high sensitivity with minimal optical fiber. For example, acceptable fiber lasers include standard distributed Bragg reflector lasers and standard distributed feedback lasers. The nominal design utilizes an air-backed transducer comprised of a flexible, pressure compliant mandrel such as a polycarbonate tube to transfer acoustic pressure into a strain on the optical fiber. When the cavity of the fiber laser is wrapped around the mandrel, vibrations of the mandrel cause the laser frequency to shift in direct proportion to the strain. For an embodiment of the invention including a distributed Bragg reflector laser, the gratings used to define the laser on the other hand are not coupled to the mandrel. For an alternative embodiment of the invention including a distributed feedback laser, the gratings are optionally in contact with the mandrel. In an embodiment of the invention, gratings are placed in close proximity to each other so as to prevent strain caused by changes in pressure or temperature from detuning the gratings relative to one another. For example, gratings in close proximity to each other includes gratings placed in the same fiber groove next to each other so that they experience the same environmental temperature change.

A coated fiber laser sensor operates by converting the external stimulus into a longitudinal strain on the "active" laser cavity, creating a frequency shift proportional to the strain. Femtostrain sensitivities can be obtained by decoding this stain-induced wavelength shift using interferometric demodulation (i.e., the interferometer is not, or need not be, part of the actual sensor). By comparison, high performance "passive" interferometric-based fiber sensors (i.e. the interferometer is an integral component of the sensor) can require more than 100 times the cavity length to achieve the same resolution, leading to larger sensors. This high sensitivity per unit lengths makes fiber laser sensors ("FLS") ideally suited for compact sensor systems. The most common fiber laser design for sensing applications is the standard distributed feedback ("DFB") fiber laser. This embodiment of the invention utilizes a standard single phase-shifted fiber Bragg grating ("FBG") written into rare earth doped optical fiber. The compact size of the laser and its short cavity length are attractive for miniature sensors requiring high sensitivity. However, for some applications, where spatial averaging is needed to reduce incoherent noise sources, distributed Bragg reflector fiber lasers ("DBR") are preferred. These lasers are comprised of two FBGs separated by a length of rare earth doped optical fiber. DBR lasers also exhibit lower frequency noise than DFB fiber lasers due to ability to extend the cavity length, resulting in higher strain resolutions.

Beyond a few centimeters, DBR lasers typically operate with multiple longitudinal modes ("MLMs"). While any strain applied to the extended cavity causes all longitudinal modes to shift their frequency in unison, interferometric demodulation requires the path imbalance of the interferometer to be an integer multiple of the laser cavity length, often challenging to achieve. Thus, laser designs that exploit a number of grating properties are necessary to produce lasers that operate with a single longitudinal mode ("SLM") for extended cavity lengths. Fabrication parameters such as the grating length, reflectivity, bandwidth, index modulation profile, average index profile, and period are, for example, adjusted to promote lasing in a SLM.

Another embodiment of the invention limits the production of MLMs to reduce the amount of feedback into the resonant cavity. Such feedback reduction can be accomplished by controlling the reflectivity of the gratings so that higher order modes do not experience enough gain to achieve lasing. The reflectivity can be adjusted using techniques readily available such as controlling the inscription laser intensity via attenuation of the beam by electrically lowering the laser current to reduce the output power, or altering the scan speed of the laser to reduce the exposure time.

Another embodiment of the invention reduces the grating bandwidth of one or both gratings such that the overlapped spectrum is also narrowed. This limits the available bandwidth for longitudinal modes to exist. Reducing the overlapped grating bandwidth can be achieved by tailoring the apodization profile (i.e., index modulation) so that one grating has a narrower bandwidth than other. For example, advanced grating profiles that produce triangular spectra can have rapidly decaying reflectivities in the vicinity of adjacent modes that limit feedback into the cavity and prevents the modes from lasing with sufficient power. Reducing the adjacent mode power by roughly 5 dB compared to the fundamental mode is generally sufficient to achieve acceptable fringe visibility for interferometric detection methods. The index modulation profile can be adjusted using a number of methods, for example employing an amplitude mask, dynamically changing the scan speed of the laser used to inscribe the grating, or dithering a phase mask to selectively reduce the fringe visibility at a particular location in the grating profile. The dithering phase mask approach is preferable as it easily permits phase shifts to be introduced into the grating profile allowing for more complex grating profiles.

In another embodiment of the invention, the grating bandwidth is optionally controlled by the adjusting the length of the grating. The longer the grating, the narrower the reflection spectrum. Consider two uniform gratings of equal reflectivity but different lengths, the bandwidth, as defined by the spectral width between the two minimums on either side of the main lobe, of the longer grating is reduced by the ratio of the grating lengths. In other words, a grating 10 times longer has in general a bandwidth 10 times less than the shorter grating. The grating length can be adjusted for example by scanning the laser over a longer length of fiber or expanding the beam to encompass a longer length of the fiber.

Another embodiment of the invention produces SLMs to shift the frequency spectrum of one grating relative to the other to reduce the spectral overlap. The spectrum can be adjusted by index tuning the grating via an increase in the average refractive index (and ultimately the effective index) or modifying directly its Bragg period. The resulting overlapped region effectively narrows the bandwidth available for longitudinal modes to exist. Modes with sufficient feedback (e.g. high enough reflectivity) will achieve lasing and the amount of spectral shift needed depends on the length of the cavity and resulting longitudinal mode spacing. Index tuning is typically facilitated by either exposing the grating to fringeless light (no interference pattern) after the initial grating inscription or simultaneously adjusting the average index profile through a dithering phase mask during the initial grating writing process. Because these techniques can cause the reflectivity of the affected grating to be altered due to the reduction in fringe contrast, another embodiment of the invention alters the grating period directly through techniques that are dependent on the laser design and fabrication setup. The period of the grating is adjusted, for example, by changing the intersection angle between the interfering beams used to inscribe the gratings, using a phase mask with a different period than the first grating, pre-straining the grating to a different tension prior to inscription, or point-by-point exposing the fiber at a different grating period.

Utilization of structural members according to an embodiment of the invention in a coated fiber sensor has several advantages. Reinforcing the coating provides a significant improvement in the acceleration response of linear coated fiber sensors. As an example, for a 7 mm diameter polyurethane-coated fiber laser sensor 40 mm in length, a six carbon fiber tube reinforced coated sensor showed on average 10 dB higher rejection (acceleration response divided by the acoustic response) at frequencies below 1 kHz than the non-reinforced version. For example, when compared to an unreinforced transducer, the reinforced sensor demonstrated a 10 dB lower acceleration sensitivity for a normalized acoustic response. The acceleration and acoustic responses of the reinforced transducers also demonstrated more than a factor of two flatter responses compared to the un-reinforced sensors. Despite the reduced acoustic response due to the strength members, the reinforced sensor attained a noise performance equivalent to sensitivity at or below SS0 for frequencies below 1 kHz (44.5 microPascal/rt.Hz). The use of fiber laser sensors has also improved the sensitivity per unit length. Because of the coherence length of the fiber laser, large imbalances in the decoding interferometer can be utilized, which provide gain to the sensing system. For an interferometric detection system employing a 25 m path imbalance, the responsivity of the fiber laser reinforced transducer is −120 dB re rad/m-microPascal compared to −153 dB re rad/m-microPascal for a coated fiber sensor utilizing a standard pressure-release material. Although rarely used in practice, a 1 m path imbalance still achieves a better performance than the prior art with −148 dB re rad/m-microPascal. Also for comparison, the un-reinforced fiber laser sensor exhibits responsivities of −127 dB re rad/m-microPascal and −99 dB re rad/m-microPascal for 25 in and 1 in imbalances, respectively. In addition, a combination of the techniques used to fabricate the fiber laser sensors has been shown to permit SLM lasing in linear DBR fiber lasers with cavity lengths on the order of 25 cm. As this is not a fundamental limit, optimization of the grating parameters and profile would likely extend this length. By reducing the spectral overlap between grating reflection bands, DBR lasers with cavity lengths of up to 1 m have been shown to operate in a SLM. Fiber lasers with cavity lengths of 10 cm have been deployed in realistic environments and have demonstrated reliability and resiliency.

In another embodiment of the invention, the coating process is facilitated using standard mass production processes, such as standard pultrusion. For example, continuous lengths of optical fiber or an optical fiber sensor array are pulled into a coating chamber along with continuous lengths of strength members. The strength members are fabricated earlier and fed into the same die as the optical fiber for coating. Alternatively, the strength members are fabricated at the same time and fed into the die with the optical fiber. Because carbon fiber rods and tubes are typically manufactured using pultrusion, their manufacturing process is seamlessly integrated into a standard coated-fiber production scheme. An exit orifice registers the strength members and the optical fiber and controls the final geometry. The coated fiber is then cured in a standard ultraviolet ("UV") or heated chamber and finally spooled for further use.

Although a particular feature of the disclosure may have been illustrated and/or described with respect to only one of several implementations, such feature may be combined with. one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

As used herein, the singular forms "a", "an," and "the" do not preclude plural referents, unless the content clearly dictates otherwise.

As used herein, the term "and/or" includes any and all combinations of one or more of the associated listed items.

As used herein, the term "about" when used in conjunction with a stated numerical value or range denotes somewhat more or somewhat less than the stated value or range, to within a range of ±10% of that stated.

All documents mentioned herein are hereby incorporated by reference for the purpose of disclosing and describing the particular materials and methodologies for which the document was cited.

Although the present invention has been described in connection with preferred embodiments thereof, it will be appreciated by those skilled in the art that additions, deletions, modifications, and substitutions not specifically described may be made without departing from the spirit and scope of the invention. Terminology used herein should not be construed as being "means-plus-function" language unless the term "means" is expressly used in association therewith.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

These and other implementations are within the scope of the following claims.

What is claimed as new and desired to be protected by letters patent of the United States is:

1. An apparatus comprising:
   a pressure sensor array comprising at least one transducer;
   an optical fiber mechanically coupled to said at least one transducer; and
   a distributed Bragg reflector fiber laser located within said optical fiber, said fiber laser emitting a wavelength, said fiber laser consisting of two fiber Bragg gratings, said two fiber Bragg gratings defining a linear cavity, said linear cavity comprising a cavity length greater than 3 cm, said linear cavity being mechanically coupled to said at least one transducer,
   wherein a pressure change detected by said at least one transducer causes at least one property change in said optical fiber,
   wherein said at least one property change in said optical fiber causes a change in the cavity length, said change in the cavity length causing a wavelength shift.

2. The apparatus according to claim 1, wherein said two fiber Bragg gratings comprise at least one of independent refractive index profiles, independent grating lengths, and independent grating periods.

3. The apparatus according to claim 1, wherein said at least one transducer comprises one of a coating for said optical fiber, a mandrel, a diaphragm, a cantilever, a piston, and a bending beam.

4. The apparatus according to claim 1, wherein said pressure sensor array comprises one of a dynamic fluid sensor array and a static fluid sensor array.

5. The apparatus according to claim 4, wherein said dynamic fluid sensor array comprises one of a hydrophone array and a microphone array,
   wherein said static fluid sensor array comprises one of a depth sensor array and a barometer array.

6. The apparatus according to claim 5, wherein said hydrophone array comprises at least one coated hydrophone, said at least one coated hydrophone comprising an acoustic-pressure-sensitive material, wherein said acoustic-pressure-sensitive material coats said optical fiber around said linear cavity.

7. The apparatus according to claim 6, wherein said optical fiber comprises a center and an axis, wherein said each coated hydrophone comprises a plurality of reinforcing members being arranged in said polymer around said linear cavity at a distance from said center and said axis.

8. The apparatus according to claim 7, wherein each reinforcing member of said plurality of reinforcing members comprises a reinforcing member length and a reinforcing member cross-sectional width, said reinforcing member length being greater than said reinforcing member cross-sectional width.

9. The apparatus according to claim 7, wherein said each reinforcing member is one of straight and helical relative to the axis.

10. The apparatus according to claim 7, Wherein said each reinforcing member comprises one of a rectangular cross-section, an elliptical cross-section, a planar cross-section, and a tubular cross-section.

11. The apparatus according to claim 7, said each reinforcing member comprising one of carbon fiber, a fiberglass-epoxy laminate, and an aromatic polyamide fiber.

12. The claim according to claim 7, wherein said coated hydrophone comprises an acoustic-pressure-insensitive material,
   wherein said optical fiber comprises at least one linear-cavity-free length,
   wherein said acoustic-pressure-insensitive material coats said optical fiber around said at least one linear-cavity-free length.

13. An apparatus comprising:
   a pressure sensor array comprising at least one coated hydrophone comprising at least one transducer, said at least one transducer comprising an acoustic-pressure-sensitive material; and
   an optical fiber mechanically coupled to said at least one transducer, said optical fiber comprises a center and an axis, said each coated hydrophone comprises a plurality of reinforcing members in said polymer and being arranged along said axis and at a distance from said center, wherein said acoustic-pressure-sensitive material coats said optical fiber.

14. The apparatus according to claim 13, wherein each reinforcing member of said plurality of reinforcing members comprises a reinforcing member length and a reinforcing member cross-sectional width, said reinforcing member length being greater than said reinforcing member cross-sectional width.

15. The apparatus according to claim 13, wherein said each reinforcing member is one of straight and helical relative to the axis,
   wherein said each reinforcing member comprises one of a rectangular cross-section, an elliptical cross-section, a planar cross-section, and a tubular cross-section.

16. The apparatus according to claim 13, said each reinforcing member comprising one of carbon fiber, a fiberglass-epoxy laminate, and an aromatic polyamide fiber.

17. The apparatus according to claim 13, further comprising:
   an interferometer comprising said optical fiber.

18. The apparatus according to claim 13, further comprising:
   a fiber Bragg grating in said optical fiber.

19. The apparatus according to claim 13, further comprising:
   two fiber Bragg gratings in said optical fiber, said two fiber Bragg gratings defining a linear cavity, said linear cavity comprising a cavity length greater than 3 cm, said linear cavity being mechanically coupled to said at least one transducer.

20. The apparatus according to claim 19, wherein said two fiber Bragg gratings comprise at least one of independent refractive index profiles, independent grating lengths, and independent grating periods.

* * * * *